April 2, 1968
J. B. PAMPLIN ETAL
3,375,823
DENTAL SYRINGE FOR SELECTIVELY DISCHARGING
DRY AIR, WATER OR SPRAY
Filed Sept. 29, 1964
2 Sheets-Sheet 1
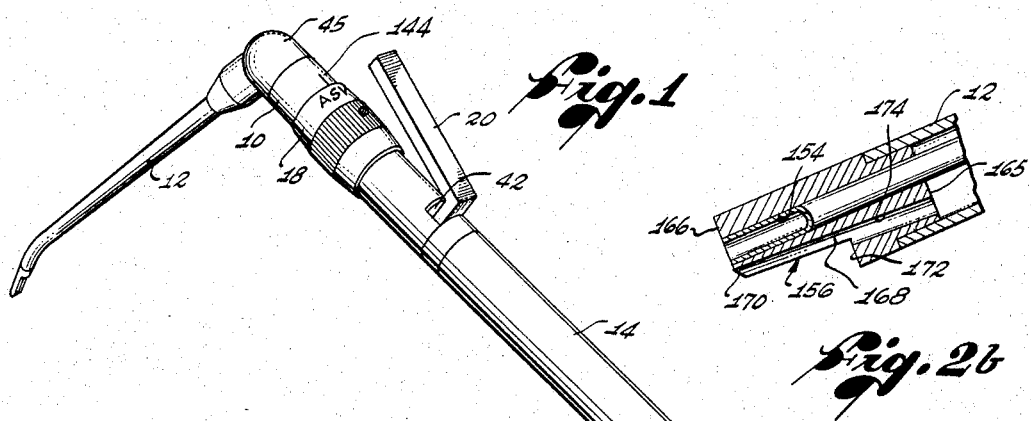
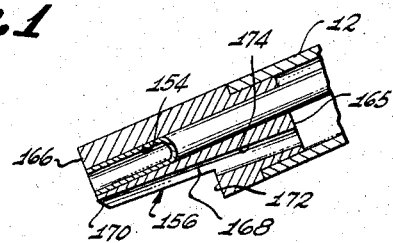
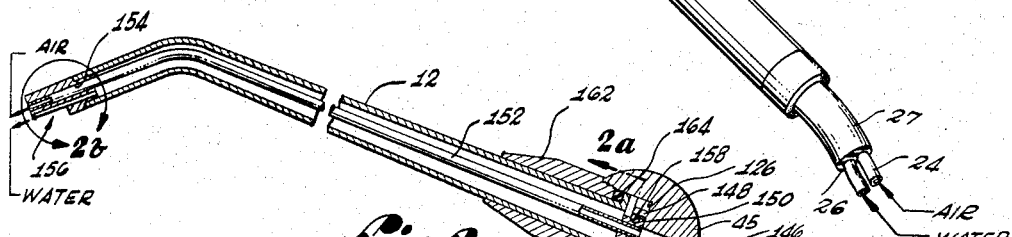
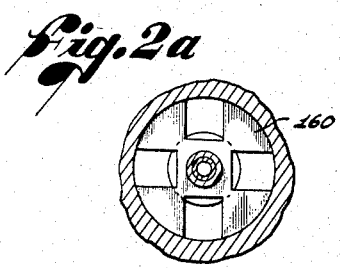
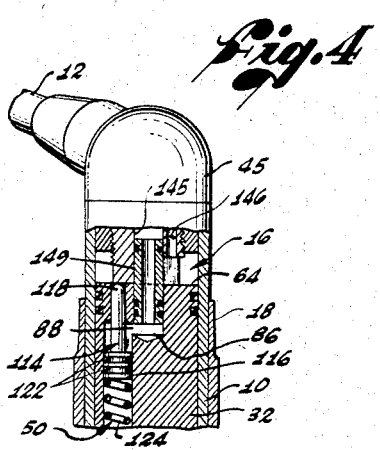
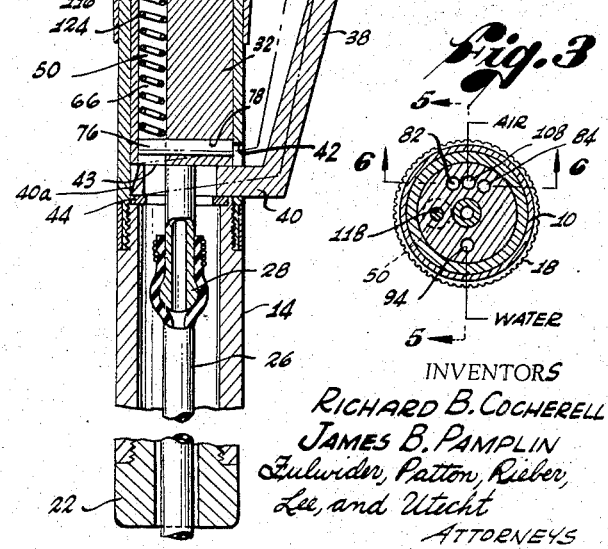
INVENTORS
RICHARD B. COCHERELL
JAMES B. PAMPLIN
Fulwider, Patton, Rieber,
Lee, and Utecht
ATTORNEYS April 2, 1968  J. B. PAMPLIN ETAL  3,375,823
DENTAL SYRINGE FOR SELECTIVELY DISCHARGING
DRY AIR, WATER OR SPRAY
Filed Sept. 29, 1964  2 Sheets-Sheet 2
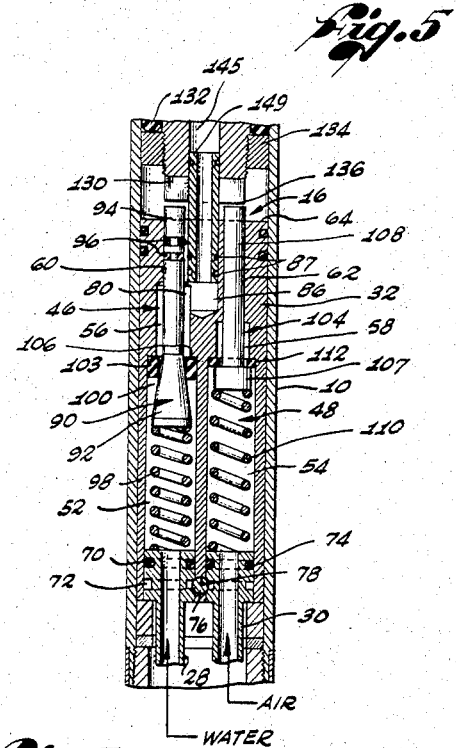
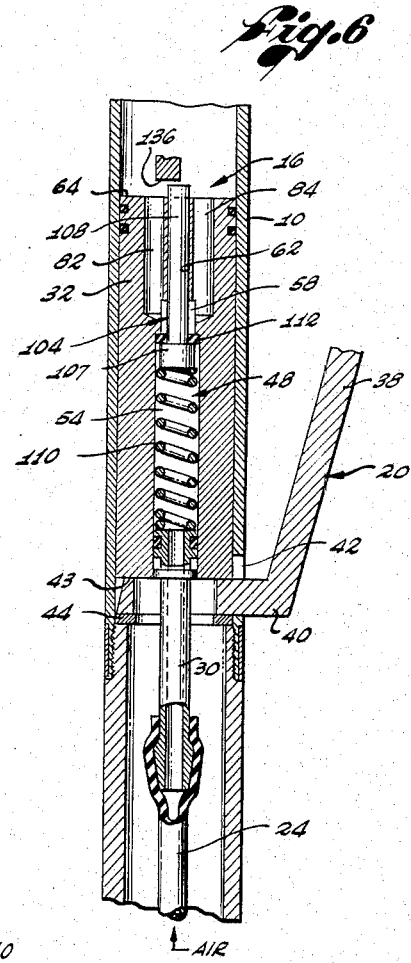
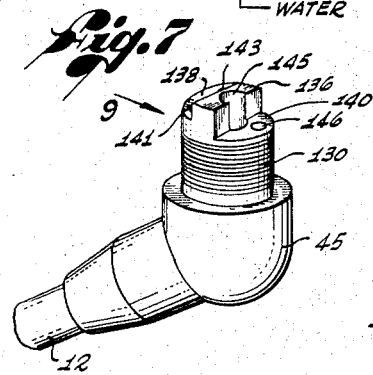
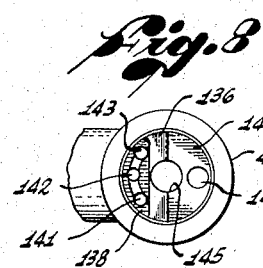
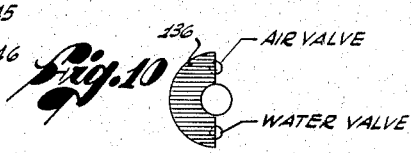
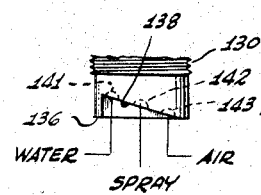
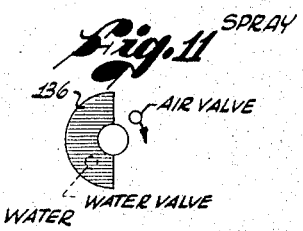
INVENTORS
RICHARD B. COCHERELL
JAMES B. PAMPLIN
Fulwider, Patton, Rieber
Lee, and Utecht
ATTORNEYS

# United States Patent Office 3,375,823
Patented Apr. 2, 1968

3,375,823
DENTAL SYRINGE FOR SELECTIVELY DISCHARGING DRY AIR, WATER OR SPRAY
James B. Pamplin, 11612 Morgan Lane, Garden Grove, Calif. 92640, and Richard B. Cocherell, 885 N. Marengo St., Pasadena, Calif. 91103
Filed Sept. 29, 1964, Ser. No. 400,177
8 Claims. (Cl. 128—173.1)

The present invention relates to improvements in dental syringes and more particularly to an extremely lightweight, compact, and inexpensive dental syringe for seliceively dispensing dry air, water or spray as desired.

Most dental units in use today include separate syringes for supplying dry air, water and spray. The three syringes require separate mounting on the unit. Also, the separate dental operations of drying, spraying and rinsing require the dentists, or the dental technician assisting the dentist, to separately select, replace and reselect the different syringes. This takes time, is very inconvenient, and reduces the efficiency of the overall dental operation.

In an attempt to overcome these problems, dental syringes have been developed which, in a single unit, provide air, water and spray. Unfortunately, however, prior three-way dental syringes possess certain disadvantages which have limited their commercial acceptance. First of all, they are relatively heavy and bulky. This presents a particular problem for the dental technician who is often required to hold the syringe either for the dentist's use, or, in or adjacent the patient's mouth for periodic actuation while the dentist operates on the patent. The syringes are so bulky that the dental technician must use her full hand to hold them. The weight of the syringe causes the dental technician's hand and arm to rapidly tire, reducing her efficiency and hence the overall efficiency of the dental operation.

Further, in present-day three-way dental syringes, as warm water from the dental unit passes through the syringe it contacts relatively large, cold metal surfaces which rapidly chill the water. This has required the use of separate heating units in the handpieces of the three-way syringes further increasing their bulk, weight and cost.

Incidentally, the weight and bulk of such dental syringes increase the chances of syringe damage resulting from inadvertent dropping and cause patient discomfort by accidental bumping of the teeth with the syringe.

Another problem in prior three-way dental syringes is that of valve design. In order to supply different types of fluid, three-way syringes, of course, include selectively operable valve assemblies. Presently, the valve assemblies are fairly complex and difficult to manufacture and maintain. Furthermore, they are relatively expensive.

Moreover, prior three-way syringes require a separate setting for air, water, or spray operations. There are occasions, however, when the dentist desires to rapidly switch from air to spray to air. In such instances, the required setting and re-setting of the syringe for each operation becomes annoying and time-consuming.

Occasions also arise when it becomes extremely important that the air supply be completely dry. Unfortunately, in prior three-way syringes, when the syringe has been supplying water and is switched to air, the first blast of air often contains water droplets either drawn from the water outlet in the syringe or blown through the tip of the syringe by the air blast.

With the foregoing in mind, it is a general object of this invention to provide an improved dental syringe for selectively dispensing water, air or spray which overcomes the foregoing problems.

More particularly, it is an object of this invention to provide a dental syringe for selectively supplying water, air or spray which is extremely light, compact and yet rugged in design and which may be easily held, as for example by the little finger of the dental technician allowing her to also hold other dental instruments in the same hand.

A further object of the present invention is to provide a dental syringe of the foregoing type having a minimum of heat dissipating surfaces contacting the water and air supplied from an associated dental unit thereby eliminating the need for a separate heating unit in the dental syringe.

A still further object of this invention is to provide a three-way dental syringe which when set for spray operation is capable of providing either dry air, moist air or a "fog spray," or an aerated stream of water by controlled operation of a single actuating lever.

Another object of this invention is to provide a dental syringe including a simple, relatively inexpensive and compact valve assembly for selectively dispensing either water, air or spray at any desired rate of flow.

Still another object is to provide a three-way dental syringe in which selection of the dry air supply position automatically insures that only dry air is dispensed upon actuation of the syringe.

The foregoing as well as other objects and advantages of this invention will be more clearly understood by reference to the following detailed description of one form of the invention when considered with the drawings in which:

FIGURE 1 is a perspective view of a presently preferred embodiment of the dental syringe of the present invention;

FIGURE 2 is a sectional view, on a diametral plane, of the syringe showing the valve assembly, actuator, head, and spout structure;

FIGURE 2a is a sectional view showing line 2a—2a in FIGURE 2 showing the water and air outlet port structure between the head and spout of the syringe;

FIGURE 2b is an enlarged sectional view of the tip of the spout illustrating the cutaway channel structure of the water outlet relative to the air outlet tubing in the spout:

FIGURE 3 is a sectional view along the line 3—3 in FIGURE 2 showing the top of the movable valve assembly;

FIGURE 4 is a view of the spout head and upper portion of the valve assembly with a portion cut away to illustrate mechanism in the syringe for drawing water into the spout when the air supply position is selected;

FIGURE 5 is a sectional view of the valve assembly along the line 5—5 in FIGURE 3 illustrating the position of the air and water valves in the assembly when closed and set for spray operation;

FIGURE 6 is a sectional view of the valve assembly along the line 6—6 in FIGURE 3, on a plane through the air valve;

FIGURE 7 is a perspective view of the head of the syringe in an inverted position to illustrate the stepped lower surface of the head;

FIGURE 8 is a plan view of the normally lower end of the head illustrated in FIGURE 7;

FIGURE 9 is a side view of the head along the arrow in FIGURE 7 but with the head in upright position; and FIGURES 10, 11 and 12 schematically depict positions of the stems of the air and water valves in the valve assembly relative to the lower surface of the head when set for spray, water and air supply operation, respectively.

Generally speaking, the dental syringe of the present invention includes a tubular valve housing 10 having a spout 12 fixed at its upper end and a hollow cylindrical handpiece 14 extending from its lower end. Water and air are separately supplied to the spout 12 through the handpiece 14 and a valve assembly 16 within the housing 10. By turning a selector sleeve 18 to air (A), spray (S), and water (W) positions, the valve assembly 16 is selectively set for the corresponding operation. Depression of an actuating lever 20 then operates the valve assembly 16 to selectively dispense either air, spray or water through the spout 12 depending upon the setting of the selector.

More specifically, the upper end of the handpiece 14 is screwed into the lower end of the housing 10 to form the barrel of the dental syringe. A bushing 22 is secured to the lower end of the handpiece 14 and receives separate air and water supply tubes 24 and 26 from the dental unit employing the dental syringe. The tubes 24 and 26 are covered with an insulating sheath 27 and pass upward through the handpiece 14 where they are secured over nipple-shaped ends of tubular connectors 28 and 30, respectively, extending from the lower end of the valve assembly 16.

The valve assembly 16 includes a cylindrical valve support body 32 having a pair of O-rings 33 at the upper end providing an air seal with the housing 10, yet allowing the valve support body to both rotate and slide within the housing. The rotation of the valve support body is controlled by the selector sleeve 18 which is fixed by a screw 34 to the valve support body through a slot 36 in one side of the housing 10.

Sliding movement of the valve support body 32 toward and away from the upper end of the housing 10 is controlled by the actuating lever 20. The actuating lever 20 is generally L-shaped having a finger contact portion 38 extending along the rear of the housing 10 toward the selector 18 and through a lower rear side slot 42. A ring-shaped base portion 40 in the housing 10 supports the lower surface 43 of the valve support body 32.

The base portion 40 of the lever 20 surrounds the tubular connectors 28 and 30 and has a flat bottom face that rests upon the upper surface of a washer shim 44 that seats on the end of the handpiece 14 extending within the housing 10. The circumference of the base portion 40 is tapered for clearance to allow the base portion to rock, at edge portion 40a, within the housing 10 as the lever 20 is depressed to cam the valve support body 32 upward within the housing.

The return of the valve support body to its normal position is produced upon the release of the actuating lever 20 by a spring biased valve structure within the valve support body 32. The valve structure includes longitudinally extending step drilled holes 46 and 48, each receiving a spring biased valve. The holes 46 and 48 have axes in the same diametral plane and include enlarger lower sections 52 and 54, respectively, intermediate sections 56 and 58 of reduced diameter, and still smaller upper end sections 60 and 62 leading to the upper surface 64 of the valve support body. A counterbored hole 50 also extends longitudinally between the upper and lower surfaces of the valve support body 32 having an axis offset from the plane of the axes of the holes 46 and 48 and includes an enlarged lower end 66, an an upper end 68 of reduced diameter. The hole 50 contains a spring biased piston in same.

As represented in FIGURE 5, the tubular connectors 28 and 30 extend into and are fixed within the lower ends of the holes 46 and 48 respectively. Thus, water is supplied to the hole 46 and air to the hole 48 which may therefore be termed the water and air holes. To fix the tubular connectors 28 and 30 within the holes 46 and 48, the upper end of each connector is enlarged for a slip fit within the respective holes. The enlarged ends each include a pair of annular recesses 70 and 72. The upper recesses 70 receive O-rings 74 to prevent fluid leakage around the connectors. The innermost portions of the lower recesses 72 receive and support the sides of a pin 76. The pin 76 passes through a hole 78 extending diametrically through the valve support body 32 to intersect inner adjacent walls of the holes 46 and 48 and pass directly through the hole 50. This coupling arrangement fastens the connectors 28 and 30 to the valve support body 32 and allows for easy and rapid disassembly of the connectors and the valve support body for cleaning and/or servicing simply by sliding the pin 76 from the hole 78.

As previously indicated, each of the holes 46, 48 and 50 receives and supports a spring-biased valve or piston. In particular, a water valve 90 within the water hole 46 has a tapered head 92 at its lower end and a stem 94 extending upwardly and slidable in the upper end 60 of the hole and normally protruding therefrom. A pair of O-rings 96 are seated within and around the stem 94 to prevent water leakage through the upper end 60 of the water hole. The lower surface of the valve head 92 rests upon the top of a helical spring 98. The bottom of the spring 98 is stationed on top of the water connector 28 such that the spring normally exerts an upward force on the valve 90 to seat the tapered section of valve head 92 against a valve seat 100, defined by a cylindrical rubber gasket 103 seated against a shoulder 106 formed by the transition between the lower and intermediate sections of the water hole 46. This gasket is slightly chamfered internally at the end receiving tapered valve head 92 and thus acts as a tapered valve seat. Thus, the water valve 90 normally blocks water flow through the valve assembly 16 to the spout 12 but, upon actuation, passes water at a rate commensurate with the extent of withdrawal of the tapered head 92 out of the tapered seat of the gasket 103.

Similarly, an air valve 104 is positioned within the air hole 48 and has a valve head 107 at its lower end with a stem 108 extending upward and slidably received through the upper end 62 of the hole to normally protrude therefrom. A compressed helical spring 110 at its lower end abuts the air connector 30 such that the spring normally exerts an upward force on the valve 104 to seat the valve head 107 against a valve seat formed by one end of a cylindrical seal or ring 112 seated against a shoulder defined by the transition of the lower and intermediate sections of the air hole 48. Thus, the air valve normally blocks air flow through the valve assembly 16 to the spout 12 but, upon actuation, passes air at a rate dependent on the extent to which the valve head 107 is moved from its seat.

A piston 116 is slidably mounted in the lower end 66 of the hole 50 and has a stem 118 slidably extending upward through the upper end 68 of the hole to normally protrude therefrom. A pair of O-rings 120 are mounted in the stem 118 to prevent water leakage through the top of the hole 50 while a pair of O-rings 122 are mounted in the piston 116 to prevent water leakage around the piston into the hole 50. The lower surface of the piston 116 abuts the top of a compressed helical spring 124 whose lower end abuts the top of the pin 76 to bias the piston 116 upwardly.

In order to provide an outlet for water from the water hole 46, a blind bore 86 is drilled through into the upper end of the valve body along the longitudinal axis of the body to the depth of the intermediate diameter portion 56 of the water hole. As is shown in FIGURE 5, the diameters of the bore 86 and the intermediate hole portion 56 and the spacing between their axes is such that there is a slight circumferential overlap resulting in the formation of a port 80 by means of which water will flow from the intermediate diameter hole portion 56 into the blind bore 86. A short piece of tubing 149 has its lower end telescoped into the blind bore 86 to provide a passage for the water upwardly and to conduct the water into the syringe head 45. A spaced pair of O-rings 87 are exteriorly mounted in the lower end of the tubing 149 to prevent leakage around the outside of the tubing. The tubing 149 is held against longitudinal and angular movement relative to the valve body by having a press fit in the bore 86, but the upper end of the tubing 149 has a slip fit within the syringe head whereby to permit relative longitudinal and angular movement of the tubing and syringe head, although reversal of the press and slip fits is possible.

In somewhat the same fashion, fluid communication is provided between the counterbored hole 50 and the blind bore 86, as best seen in FIGURE 4. Thus, the blind end of the bore 86 intersects the upper end of the enlarged diameter portion 66 of the hole 50 to define a port 88 communicating the two bores. Thus, upon downward displacement of the piston 116, as shown in FIGURE 4, the displaced water can enter the hole 50 from the blind bore 86 through the port 88.

The passages for conducting air out of the valve body 32 are best seen in FIGURE 6, the plane of the section being the line 6—6 of FIGURE 3, rather than a diametral plane. Thus, a pair of blind bores 82 and 84 are drilled into the top end of the valve body, these bores along with the air hole 48 having axes circularly spaced as shown in FIGURE 3. The blind bores 82 and 84 are drilled to a depth to intersect at their lower ends the intermediate diameter portion 58 of the air hole, thus providing ports intercommunicating the pair of bores 82 and 84 with the intermediate portion 58. Thus, since the stem 108 of the air valve 104, 106 slidably occupies the smallest diameter portion 62 of the air hole, when the valve 104 is opened, air passes around the valve head through the intermediate diameter portion 58 of the air hole and then enters into both of the blind bores or ports 82 and 84, to pass upwardly.

The syringe head 45 is adapted to perform various functions. First, it rotatably supports the spout 12 in an airtight fashion and provides separate air and water ports from the valve assembly 16 to the spout 12. Second, the syringe head 45 provides an abutment within the housing 10 for actuating particular ones and combinations of the water and air valves as they travel with the valve support body 32 in response to a depression of an actuating lever 20. Finally, the syringe head 45 acts as a relatively stationary reference against the valve and piston stems and compressed springs to return the valves, valve support body 32, and actuating lever 20 to their normal position as the lever is released.

To accomplish the foregoing, the syringe head 45 includes a hemispherical top surface having an upwardly and forwardly extending hole 126 for receiving the spout 12. The syringe head 45 rests on top of an annular integral flange 128 extending inwardly around the opening in the top of the housing 10 and has a central lower portion 130 extending downwardly into the housing over the upper surface 64 of the valve support body 32. The lower portion 130 is externally threaded and receives an O-ring 132, for an air seal, seated against the flange 128 and a locking nut 134, with spanner slots, for compressing the O-ring and securing the syringe head 45 to the top of the housing.

As illustrated most clearly in FIGURES 7, 8 and 9, the lower end of the lower portion 130 is stepped and includes a generally rectangular valve contact surface 136, a cam surface 138 and a semicircular surface 140, all in different planes. The cam surface 138 includes three circularly spaced indexing depressions 141, 142 and 143. The cam 138 confronts and contacts the end of the piston stem 118 so that the piston stem rides along the cam incline in response to rotation of the valve body 32 by manipulation of the selector sleeve 18.

More particularly, the selector sleeve 18 is indexed relative to a position of the syringe head 45 such that when the selector sleeve 18 is turned to bring the marking W opposite an indexing mark 144 engraved in the outer surface of the housing 10, the stem of the piston 114 lies within the depression 141 to releasably lock the dental syringe in a position ready to supply water through the valve assembly to the spout 12 in response to a depression of the actuating lever 20. Similarly, the markings S and A on the selector sleeve 18 are indexed with the depressions 142 and 143 such that when the selector sleeve 18 is turned in a clockwise direction to bring the S and A opposite the mark 144, the end of the piston stem 118 travels along the incline 138 and enters the depressions 142 and 143 to releasably lock the dental syringe in positions for spray and dry air operation respectively.

The contact surface 136 of the syringe head 45 is disposed in a diametral plane and depresses particular ones or combinations of the air and water valves in response to the upward travel of the valve body 32. In this regard, rotation of the valve support body 32 with the selector sleeve 18 brings different ones of the valve stems under the valve contact surface 136. The relative positions of the stems of the air and water valves under the contact surface 136 are as illustrated in FIGURES 10, 11 and 12 when the selector sleeve 18 is positioned with the markings for spray, water and air operation (S, W, A) respectively, opposite the index marking 144. Thus, when the selector sleeve 18 is in the S or spray position, the stems 108 and 94 of the air and water valves lie under the valve contact surface 136. Depression of the actuating lever 20 then slides the valve support body 32 upward within the housing 10 bringing the stems of the air and water valves into contact with the contact surface 136, depressing the valve stems and opening the air and water valves 104 and 90 to allow air and water to separately flow through the syringe head 45 and into the spout 12.

In this connection, it should be noted that the piston stem 118 normally protrudes far enough from the valve body 32 so that there is a clearance maintained between the contact surface 136 and the protruding ends of the air and water valve stems, when the valves are closed. The air and water valve stems may, if desired, protrude the same distance from the valve body 32 so that in the spray position of the device, both the air and water valves will open simultaneously. However, the arrangement shown in FIGURE 5 is preferred wherein the air valve stem protrudes farther from the valve body, say, by a distance of 5/1000″, but yet is prevented from contact with the surface 136 when the syringe is in the off position. This differential protrusion of the air and water valve stems is highly advantageous in that it permits operation of the device when in the spray position to give first—dry air only, second—a spray in which the water and air streams combine to form a mist or fog spray, and thirdly—a large volume of water that is sufficiently aerated to avoid excessive splashing.

When the selector sleeve 18 is set in the W or water supply position, depression of the actuating lever 20 causes the water valve stem 94 to be depressed opening the water valve 90 to supply water through the syringe head to the spout 12. At the same time, the stem of the air valve 104 travels upward with the valve support body 32 in the clearance space under the surface 140 of the syringe head. The reverse occurs when the selector sleeve 18 is set in the A or dry air position to supply air to the spout 12.

In order to conduct water from the valve assembly 16 to the spout 12, the syringe head 45 includes an axially disposed blind bore 145 whose blind end intersects a side of the spout receiving hole 126 to define a small port 148. The lower end of the central hole 145 snugly receives the upper end of the tube 149 having a lower end telescopically slidable within the bore 86 in the valve-support body 32. As previously indicated, the tube 149 provides a conduit for water from the open water valve 90 through the port 148 in the syringe head to the end of the spout 12. Once in the spout 12, the water surges towards the open end of the spout leaving in a stream through a water outlet port 174 in a specially designed tip 156 seated within the open end of the spout.

An air hole 146 is formed through the syringe head 45 by two angularly related bores that intersect at their inner ends. The opening of the hole 146 into the spout receiving hole 126 is surrounded by an integral collar 148 for seating the annularly flanged end 150 of an air tube 152. The air tube 152 extends the length of the hollow spout 12 with its forward tip end seated within an air outlet port 154 in the special tip 156. Thus, when the air valve 104 opens, air flows through the open valve, the side ports 82 and 84, the clearance space between the head 45 and valve body 32, and the hole 146 directly into the air tube 152. The air flows rapidly down the air tube and jets from the spout 12 through the tip of the air tube seated in the air outlet port 154 of the special tip 156.

As previously indicated, the spout 12 is rotatably coupled in an airtight fashion to the syringe head 45. To accomplish this, an O-ring 158 extends around the air tube 152 within the collar 148 between the flange 150 and a spider 160 having arms extending radially from its hub. The spider 160 is seated on the end of the collar 148 over the water-receiving annulus around the collar. The inner end of the spout 12 is formed with an integral circumferentially outwardly extending flange 161 that is seated on top of the spider 160. As is shown in FIGURE 2, the internal diameter of the inner end of the spout 12 is large enough to define water passages with the spaces between the arms of the spider 160 whereby water flows into the annulus defined between the air tube 152 and the wall of the spout 12. If desired, a protective screen (not shown) may be placed between the flange and spider to keep particles out of water entering the spout 12.

The spout 12 is held in place on the syringe head 45 by means of a tubular nut 162 sleeved over the spout. As is shown in FIGURE 2, the nut 162 is threadedly engaged in the spout-receiving hole 126 and under its inner end bears on an O-ring 164 that is seated on the integrally formed flange 161 of the spout 12, with sufficient force to provide an air-tight seal, but at the same time permitting the spout 12 to be rotatably held within the tubular nut for angular movement about its longitudinal axis. Thus, the spout can be rotated through 180° from the position shown in FIGURE 2, whereby the bent tip of the spout 12 can be directed upwardly rather than downwardly for directing air, water or spray to otherwise inaccessible parts of the patient's mouth.

As indicated, the tip 156 is of a special design. In particular, an end 165 of the tip is adapted to fit tightly within the open end of the spout 12 such that the air outlet port 154 receives the end of the air tube 152. The opposite or outer end 166 of the tip 156 is of a stepped design having a channel 168 extending along a relieved side of the tip and below the air outlet port 154 from a chamfer 170 at the outer end of the tip to a shoulder 172. The water outlet port 174 passes through the tip 156 from the end 165 within the spout 12 to the shoulder 172 and along the channel 168 on an axis converging with the axis of the air port 154 at an angle of about one and one-half degrees (1½°).

The special design of the tip 156 allows the tip to perform several important functions. First, the positioning of the air and water outlet ports, one atop the other with the shoulder 172 of water outlet port 174 spaced to the rear of the forward opening for the air outlet port 154 prevents water from being drawn out of the water oulet port as air streams from the air outlet port during dry air operation of the dental syringe. During water or spray operation, the channel 168 serves as a guide for the water stream leaving the water outlet port 174 to insure a straight, unbroken water stream which during spray operation enters the air stream beyond the end of the tip 156 to produce a fine mist spray. During water only operation, the chamfer 170 at the end of the tip serves to break an otherwise sharp edge and so prevents light jets of water from being deflected off the axis of channel 168. The channel 168 also acts as a guide for drawing water at the end of the tip 156 into the spout 12 when the selector sleeve 18 is turned to bring the valve assembly into the dry air supply position.

The water passages of the syringe downstream of the water valve 90 are normally charged with water, even when the syringe is inactive. Thus, water will be found in the intermediate diameter portion 56 of the water hole, the axial bore 86, the connecting tube 149, the axial bore 145 in the syringe head, the annulus around the collar 158, and throughout the annular space defined between the air tube 152 and the wall of the spout 12 from end to end of the spout. It will be noted that the volume of the water passages is not constant, but is dependent on the position of the piston 116 in the hole 50, the space above the piston also forming a portion of the water volume. Thus, referring to FIGURE 9, when the upper end of the stem 118 of the piston 116 is in the water position W in which it engages the depression 141, the volume is the smallest; when in the spray position S, the volume is slightly larger, and when in the air position A in the depression 143, the volume is the greatest. When the selector sleeve 18 is rotated to the air position, the piston 116 is cammed downwardly within the hole 50 and the resulting volumetric displacement of water in all of the passages down to the water exit port 174 is sufficient to draw into the port any water contained in the groove 168 of the tip. Thereafter, when the lever 20 is depressed to open the air valve 106 (the water valve 90 remaining closed), there will be no water in the groove 168, at least not sufficiently close to the exit orifice of the air tube tip 154 to be siphoned off by the air stream. Accordingly, only completely dry air is blown into the patient's mouth.

Now, if it is desired to use a spray in the patient's mouth, the selector is switched to the spray position. This of course displaces the piston 116 upwardly in the hole 50, effecting a corresponding displacement of the water in the passages, and perhaps, a droplet into the tip groove 168 or at least to the face of the shoulder 172. Then, when the lever 120 is depressed firmly, both the air and water valves are opened and water is immediately available in the groove 168 for entry into the air stream as the air blast is initiated. This creates an instantaneous spray without first going through a noticeable phase of dry air only, if the actuating lever is firmly pressed beyond the initial contact of the surface 136 with the air valve stem 108.

Then, when the selector 18 is shifted into the water position, the piston 116 is displaced even further upwardly in the hole 50, to effect a corresponding displacement of the water in all of the water passages to insure that all of these passages are charged with water at least to the outlet orifice of the water port 174.

The water droplet removal feature of the dental syringe is of great practical importance and represents a substantial improvement over other three-way dental syringes. For example, before a filling compound should be introduced into a drilled area, the area should be completely dry. Often, in properly forming the area to receive the filling compound or to completely remove decay from the tooth, the dentist must come close to a nerve or to the pulp of the tooth. Even with a local anesthetic such areas are extremely sensitive to air. To keep the patient's discomfort at a minimum, it is therefore desired to dry the area with as little air as possible. If water droplets are sprayed with the first blast of air into the area, this materially increases the amount of air required to completely dry the area and adds to the pain of the patient. The problem of moisture in the dry air supply is not present with the syringe of the present invention since water droplets are automatically removed from the tip of the syringe prior to air flow.

When the dental syringe is set in the spray supply position, it possesses an important added feature in that it passes through three distinct phases. These phases are first—air only, second—air and water proportioned to result in a spray of highly aerated water, or a "fog spray,"

and thirdly—a phase of water and air in which the volume of water in proportion to the volume of air is such that the jet of water is sufficiently aerated that, although a large volume of water is delivered, the resulting aerated jet does not cause excessive splash upon striking a surface, as occurs with a jet of unaerated water. This feature results from the fact that the air valve stem 108 protrudes farther from the valve body 32 than does the water valve stem, thus giving the air-only phase of operation. By selecting a suitable proportion of the diameters of the air and water outlet orifices in the tip (for example, .039 inch for air and .025 to .035 inch for water) when the actuator lever 20 is fully depressed, the resulting volume of water will be so aerated by the accompanying jet of air to avoid excessive splash of the relatively large volume of water. In the latter connection, the tapered configuration of the water valve head 90 and the slight complementary chamfer on the valve seat member 103 are of assistance in proportioning the volume of water to the volume of air in the intermediate phase, in which a "fog spray" is desired, and in finally allowing a large volume of water without excessive splash.

This three phase operation of the syringe in the spray position can very readily be mastered by the user since the initial contact of the air valve stem 108 with the surface 136 can be felt in the actuating lever 20 and produces air only. A further increment of movement of the lever 20, to shift the valve body 32 further upwardly until the water valve stem 94 contacts the surface 136, can also be felt in the lever. When both the air and water valve stems are in contact with the surface 136, there is a marked increase in the resistance to further depression of the lever 20, which is easily sensed in the fingers of the user. Thereafter, further depression of the lever 20 first gives the "fog spray" and finally results in the water valve head 90 being opened to such an extent that the fog disappears and is succeeded by aerated water.

From the foregoing, it can be appreciated that the present invention provides an improved dental syringe for selectively dispensing water, air or spray, at a desired rate of flow. It is lightweight, compact and yet rugged in design. It insures a truly dry air supply. The dentist can selectively dispense dry air, or "fog spray," or aerated water, as desired, simply by depressing a single lever. The syringe also maintains a complete separation at all times between the air and water supply within the syringe and a minimum of cold metal surfaces contact the air and water within the syringe thereby reducing heat dissipation and eliminating the need for a separate heating unit in the syringe.

In the foregoing specification, a specific embodiment of the dental syringe has been described. Modifications, of course, may occur to those skilled in the art without departing from the spirit of this invention. Accordingly, it is intended that the present invention be limited in scope only by the following claims.

We claim:
1. In a dental springe having selectively operable valve controlled air and water passage means and adjacent air and water discharge orifices in a spray tip of the syringe, the combination comprising:
 a housing with separate air and water passage means therethrough;
 a variable volume chamber within said housing having fluid communication with said water passage means downstream of a valve means for controlling said water passage means;
 selector means operatively associated with said water valve means and with an air valve means for said air passage means to effect joint and separate operation of said air valve and water valve;
 and means interconnected between said selector means and said variable volume chamber to effect a predetermined volumetric enlargement of said variable volume chamber when said selector means is positioned to permit opening of said air valve only, whereby to draw into said water outlet orifice any water disposed immediately outside of said water orifice on said spray tip.

2. A dental syringe for selectively dispensing water, air or spray, comprising:
 a tubular housing having a dispensing spout fixed at one end and means for separately receiving water and air at an opposite end;
 a valve assembly supported for rotation and longitudinal sliding movement within said housing and including a normally closed water valve for blocking water flow to said spout and a normally closed air valve for blocking air flow to said spout;
 means fixed to said tubular housing and having a contact surface in said housing for opening preselected combinations of said valves brought into contact with said contact surface by sliding movement of said valve assembly within said housing;
 means for selectively rotating said valve assembly to bring preselected combinations of said valves adjacent said contact surface;
 means for sliding said valve assembly within said housing to bring a preselected combination of said valves into contact with said contact surface to open said combination of valves and dispense a predetermined fluid type from said spout;
 and means within said housing and communicating with said spout for drawing water droplets at a tip of said spout into said spout when said valve assembly is rotated to bring said air valve adjacent said contact surface.

3. A dental syringe for selectively dispensing water, air or spray, comprising:
 a tubular housing;
 a head member fixed to one end of said housing and having isolated air and water holes passing through said head member into said housing;
 means for separately supplying water and air to an opposite end of said housing;
 a valve assembly supported for rotation and sliding movement within said housing and including a normally closed water valve communicating with said water supply means for blocking water flow to said water hole and a normally closed air valve communicating with said air supply means for blocking air flow to said air hole;
 contact means fixed within said housing for opening preselected combinations of said valves brought into contact with said contact means by sliding movement of said valve assembly within said housing;
 a hollow spout having an open head connecting end coupled to said head over said air and water ports and a tip end having physically separated and substantially parallel air and water outlet ports, said air outlet port extending beyond said water outlet port, and said tip end of said spout including a channel continuous with said water outlet port and extending to an outer end of said tip end of said spout;
 an air tube within said spout with one end surrounding said air hole in said head member and an opposite end extending into said air outlet in said tip of said spout;
 means for selectively rotating said valve assembly to bring preselected combinations of said valves adjacent contact means;
 and means for selectively sliding said valve assembly within said housing to bring a preselected combination of said valves into contact with said contact means to open said combination of valves and dispense a predetermined fluid type from said spout.

4. A dental syringe for selectively dispensing water, air or spray, comprising:
 a tubular housing;
 a head member fixed to one end of said housing and having isolated air and water holes passing through said head member into said housing;

means for separately supplying water and air to an an opposite end of said housing;

a valve assembly supported for rotation and sliding movement within said housing and including a normally closed water valve communicating with said water supply means for blocking water flow to said water hole and a normally closed air valve communicating with said air supply means for blocking air flow to said air hole;

contact means fixed within said housing for opening preselected combinations of said valves brought into contact with said contact means by sliding movement of said valve assembly within said housing;

a hollow spout having an open head connecting end coupled to said head over said air and water ports and a tip end having physically separated and substantially parallel air and water outlet ports, said air outlet port extending beyond said water outlet port, and said tip end of said spout including a channel continuous with said water outlet port and extending to an outer end of said tip end of said spout;

an air tube within said spout with one end surrounding said air hole in said head member and an opposite end extending into said air outlet in said tip of said spout;

means for selectively rotating said valve assembly to bring preselected combinations of said valves adjacent contact means;

means for selectively sliding said valve assembly within said housing to bring a preselected combination of said valves into contact with said contact means to open said combination of valves and dispense a predetermined fluid type from said spout;

and means within said housing and communicating with said water hole in said head member for drawing water droplets at said tip of said spout along said channel into said spout when said valve assembly is rotated to bring said air valve adjacent said contact means.

5. The dental syringe of claim 4 wherein said means for drawing water droplets into said spout includes:

a chamber having a side port communicating with said water hole in said head;

a piston supported for sliding movement within said chamber;

and means within said housing for moving said piston to enlarge said chamber when said valve assembly is rotated to bring said air valve adjacent said contact means.

6. A dental syringe for selectively dispensing air, water or spray, comprising:

a tubular housing;

a head member fixed to one end of said housing and having isolated air and water ports passing through said head into said housing and a stepped lower surface including a lower valve contact surface, an upwardly inclined surface to one side of said contact surface and an upper surface on an opposite side of said contact surface and including lower openings of said air and water ports;

means for separately supplying water and air to an opposite end of said housing;

a valve support body stationed within said housing for both rotational and longitudinal sliding movement within said housing with an upper surface facing said stepped lower surface of said head member and a lower surface facing said supply means, said valve support body having first, second and third holes, said first and second holes extending between said upper and lower surface and said third hole stationed under said inclined surface of said head member, said valve support body further including first, second and third side ports from said first, second and third holes respectively, said first and second side ports extending to said upper surface of said valve body and said side port extending to said first side port;

tube means coupling said first side port to said water port in said head member;

separate means for coupling said water and air supplies to lower ends of said first and second holes, respectively;

a first valve within said first hole having a head normally blocking said first hole to prevent water flow to said water port and a stem extending upwardly through said upper surface of said valve support body;

a second valve within said second hole having a head normally blocking said second hole to prevent air flow to said air port in said head member and a stem extending upward through said upper surface of said valve support body;

a piston within said third hole having a stem extending upwardly through said upper surface of said valve body to contact said inclined surface;

spring means normally urging said piston upward within said third hole with a head of said piston normally adjacent said third port;

a hollow spout having an open head connecting end coupled to said head member over said air and water ports and a tip end having physically separated air and water outlets;

an air tube within said spout with one end surrounding said air port in said head member and an opposite end extending into said air outlet in said tip of said spout;

hand operable means fixed to said valve support body for turning said body within said housing to three different positions wherein said stem of said piston contacts an upper end, the middle, and a lower end of said inclined surface and said stems of said first valve, said first and second valves, and second valves, are under said contact surface of said head;

and hand operable means for sliding said valve support body towards said valve contact surface to depress and open said valves with stems under said contact surface.

7. The dental syringe of claim 6 wherein said inclined surface includes three depressions indexed with said three different positions for said valve support body for receiving an upper end of said piston to releasably lock said valve body in each position thereby preventing inadvertent shifting between said positions.

8. A dental syringe for selectively dispensing air, water or spray, comprising:

a tubular housing;

a head member fixed to one end of said housing and having isolated air and water ports passing through said head into said housing and a stepped lower surface including a lower valve contact surface, an upwardly inclined surface to one side of said contact surface and an upper surface on an opposite side of said contact surface and including lower openings of said air and water ports;

means for separately supplying water and air to an opposite end of said housing;

a valve support body stationed within said housing for both rotational and longitudinal sliding movement within said housing with an upper surface facing said stepped lower surface of said head member and a lower surface facing said supply means, said valve support body having first, second and third holes, said first and second holes extending between said upper and lower surface and said third hole stationed under said inclined surface of said head member, said valve support body further including first, second and third side ports from said first, second and third holes respectively, said first and second side ports extending to said upper surface of said valve body and said side port extending to said first side port;
tube means coupling said first side port to said water port in said head member;
separate means for coupling said water and air supplies to lower ends of said first and second holes, respectively;
a first valve within said first hole having a head normally blocking said first hole to prevent water flow to said water port and a stem extending upwardly through said upper surface of said valve support body;
a second valve within said second hole having a head normally blocking said second hole to prevent air flow to said air port in said head member and a stem extending upward through said upper surface of said valve support body;
a piston within said third hole having a stem extending upwardly through said upper surface of said valve body to contact said inclined surface;
spring means normally urging said piston upward within said third hole with a head of said piston normally adjacent said third port;
a hollow spout having an open head connecting end coupled to said head member over said air and water ports and a stepped tip end having physically separated and substantially parallel air and water outlets, said air outlet extending beyond said water outlet, and said tip end of said spout including a channel continuous with said water outlet and extending to an outer end of said tip end of said spout;
an air tube within said spout with one end surrounding said air port in said head member and an opposite end extending into said air outlet in said tip of said spout;
hand operable means fixed to said valve support body for turning said body within said housing to three different positions wherein said stem of said piston contacts an upper end, the middle, and a lower end of said inclined surface and said stems of said first valve, said first and second valves, and second valves, are under said contact surface of said head; and hand operable means for sliding said valve support body towards said valve contact surface to depress and open said valves with stems under said contact surface.

References Cited

UNITED STATES PATENTS 1,382,640 6/1921 Heinrich _____ 239—415
3,254,646 6/1966 Staunt et al. _____ 128—173.1

FOREIGN PATENTS 384,738 12/1932 Great Britain.
726,335 3/1955 Great Britain.

RICHARD A. GAUDET, *Primary Examiner.*

R. L. FRINKS, K. L. HOWELL, *Assistant Examiners.*